United States Patent

[11] 3,626,172

[72] Inventor Richard Myszko
 2786 Ater Drive, Xenia, Ohio 45385
[21] Appl. No. 888,586
[22] Filed Dec. 29, 1969
[45] Patented Dec. 7, 1971

[54] LIGHTING STRUCTURE FOR NIGHT TRAP SHOOTING AND THE LIKE
 4 Claims, 1 Drawing Fig.
[52] U.S. Cl...................................................... 240/3
[51] Int. Cl...................................................... F21p 1/00
[50] Field of Search............................................ 240/1, 25,
 46.01, 46.45, 46.53, 3, 3.1, 41.2; 273/96, 101.1;
 35/25, 12 N

[56] References Cited
OTHER REFERENCES
Lighting for Recreations, by J. H. Kurlander, Apr. 19, 1926, pp. 30, 34 and 35

Primary Examiner—S. Clement Swisher
Assistant Examiner—William A. Henry, II
Attorney—William R. Jacox ABSTRACT: Lighting structure which is particularly adapted for night trap shooting activities or the like. The lighting structure includes a source of light, such as a lamp, or a bulb, or the like. Adjacent the source of light is a panel or the like which includes means for attenuation of light from the lamp, so that attenuated light from the source of light illuminates a region within which a trap shooter is disposed. Other light from the source of light is also permitted to flow without attenuation to a target region within which targets move.
Thus, some of the light rays from the source of light flow directly to a target region, while some of the light rays from the source of light flow through means which greatly reduce the intensity thereof in a region in which a person who shoots the targets is disposed.

PATENTED DEC 7 1971          3,626,172
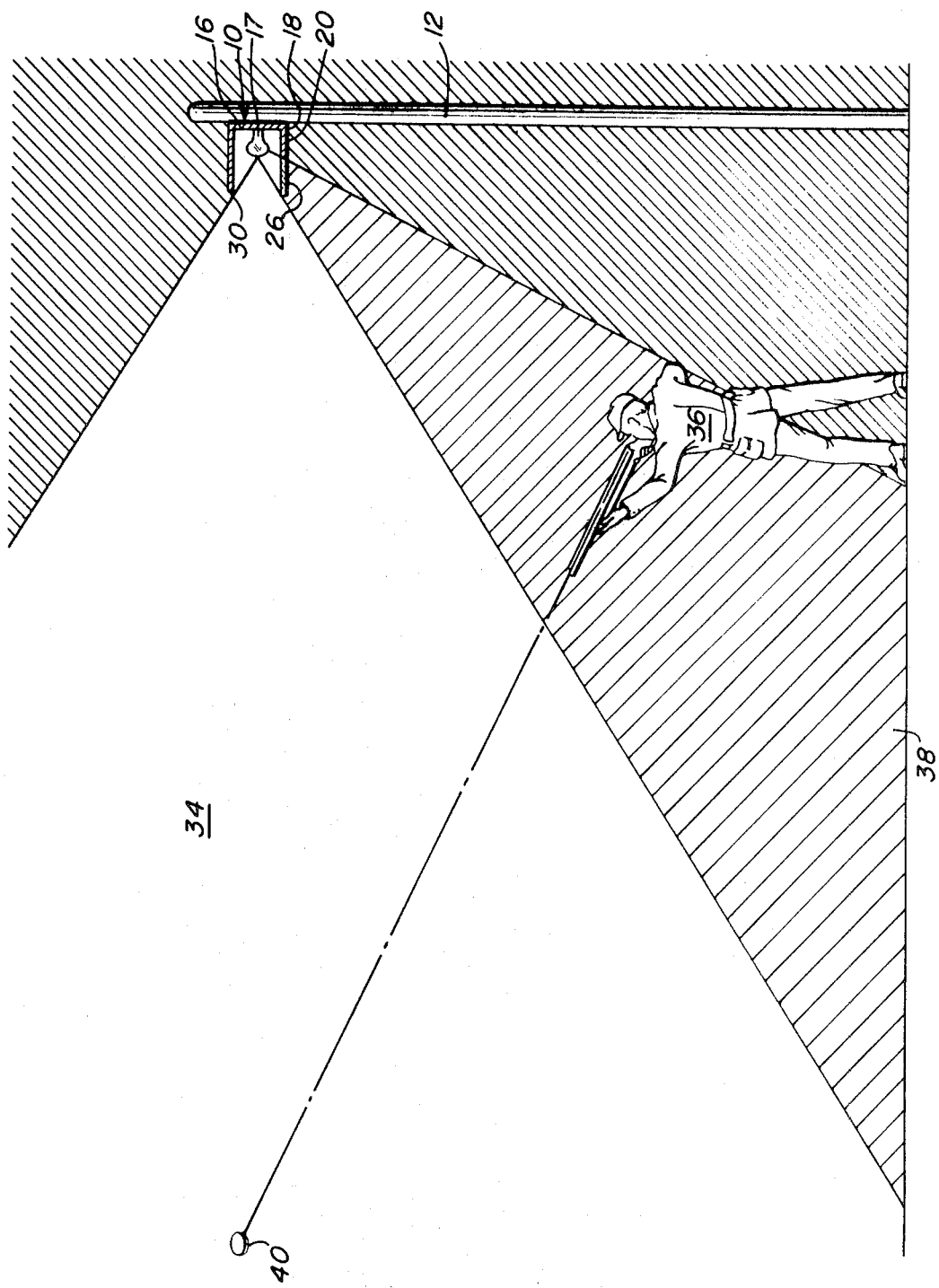
INVENTOR
RICHARD MYSZKO
BY William R Jacox
ATTORNEY

LIGHTING STRUCTURE FOR NIGHT TRAP SHOOTING AND THE LIKE

BACKGROUND OF THE INVENTION

One of the major problems which has occurred in the art of trap shooting at night is that a target should be well lighted. Even the best artificial lighting means does not illuminate a target so well as daylight. However, when a shooter is disposed in a target region which is well lighted by artificial light means, his eyes react to the light in a manner to partially close the pupils of his eyes. Therefore, when a target appears in the artificially lighted region, the shooter has less than maximum visual capacity to shoot at the target.

Thus, an object of this invention is to provide artificial lighting structure for night trap shooting or the like from which some of the light rays from a source of light provide light directly to a target region and from which some of the light rays from the source of light in the form of attenuated light flow to a target shooter region in which a shooter is disposed.

BRIEF DESCRIPTION OF THE DRAWING

The figure of the drawing is a diagrammatic type of view of lighting structure of this invention, illustrating operation thereof.

DESCRIPTION OF THE PREFERRED EMBODIMENT

Lighting structure 10 of this invention is shown mounted near the top of a long vertically disposed pole 12. A base 16 attaches the lighting structure 10 to the pole 12. Supported by the base 16 is a lamp 17. Extending from the base 16 below the lamp 17 is a substantially horizontal panel 18. The panel 18 has an opaque portion 20 adjacent the base 16. The panel 18 has an attenuation portion 26 spaced from the base 16. The attenuation portion 26 may be of any suitable translucent material which does not permit all of the light rays from the lamp 17 which engage the portion 26 to pass therethrough. The attenuation portion 26 may comprise a colored glass, such as amber colored glass, or a light filter member or the like. Preferably, the attenuation portion 26 is of a material which greatly attenuates spectral radiation in the ultraviolet and infrared regions, while permitting transmission of light energy therethrough in the humanly visible spectral regions. However, the attenuation portion 26 may be any translucent material which considerably attenuates any or all of the light rays passing therethrough.

An opaque cover 30 is also shown attached to the base 16, above the lamp 17. Thus, a housing for the lamp 17 is formed. However, such a cover member as the cover 30 is not necessary to fulfill the purposes of the lighting structure of this invention. The space between the cover 30 and the panel 18 at the portion thereof opposite the base 16 is shown as being open. However, any clear translucent member may be disposed between the panel 18 and the cover 30, in a position spaced from the base 16, through which light rays from the lamp 17 may pass.

OPERATION

When lighting structure of this invention is employed in night trap shooting, a target region 34 is lighted by light rays which pass directly from the lamp 17 to the target region 34, as illustrated in the drawing. However, a shooter 36, standing in a shooter region 38, which is adjacent the target region 34, is illuminated by light which flows through the attenuation portion 26 of the panel 18. Thus, the shooter 36 is illuminated by light which has considerably less intensity than that in the target region 34. Due to the fact that the shooter 36 is in a region which has relatively low-intensity light, the pupils of the eyes of the shooter 36 are relatively large. The pupils of the eyes of the shooter 36 are considerably larger than they would be if the shooter 36 should be within the well lighted target region 34.

Thus, when a target 40 enters the target region 34, and the shooter 36 looks into the target region 34, the pupils of the eyes of the shooter 36 are relatively wide open. Therefore, the shooter 36 looks into a well lighted region while the shooter's eyes are adapted for low-intensity light. Thus, the shooter 36 is capable of easily and readily seeing the target 40. Therefore, the shooter 36 has a much better visual perception of the target 40 than if the shooter 36 should be disposed within a region which is lighted in the same manner as the target region 34. Therefore, the shooter 36 may have greater success in shooting the target 40.

The invention having thus been described, the following is claimed:

1. Lighting structure adapted to be disposed in an elevated position above a trap shooting area comprising:
   a housing including a substantially vertical base,
   the housing also including a substantially horizontal panel attached to the base and extending therefrom,
   a lamp within the housing and disposed above the panel,
   the panel having an attenuation portion so that light from the lamp which travels therethrough is attenuated light which lights a region within which a shooter is disposed,
   the housing also having a front portion through which light from the lamp passes directly to a target region, without attenuation.

2. The lighting structure of claim 1 in which the panel also has an opaque portion through which light from the lamp cannot pass.

3. The lighting structure of claim 1 in which the attenuation portion of the panel is of a material which greatly attenuates spectral radiation in the ultraviolet and infrared regions, while permitting transmission of light energy therethrough in the humanly visible spectral regions.

4. Lighting structure for night trap shooting or the like comprising:
   support structure,
   light source means carried by the support structure for lighting a target region and a shooter region, adjacent thereto,
   light attenuation means carried by the support structure adjacent the light source means for causing light which flows from the light source means to the shooter region to be of lesser intensity than the intensity of the light which flows from the light source means to the target region,
   the light source means including a lamp,
   the support structure including a housing having a bottom panel, a portion of the bottom panel being of opaque material so that no light flows therethrough from the lamp, a portion of the bottom panel being translucent material which filters a part of the light which flows therethrough from the lamp, the light from the lamp thus being attenuated as the light flows through the translucent material, the housing having a front part through which light from the lamp flows without attenuation.

* * * * *